W. H. FROST.
TRAP.
APPLICATION FILED FEB. 12, 1913.
1,085,599.
Patented Feb. 3, 1914.
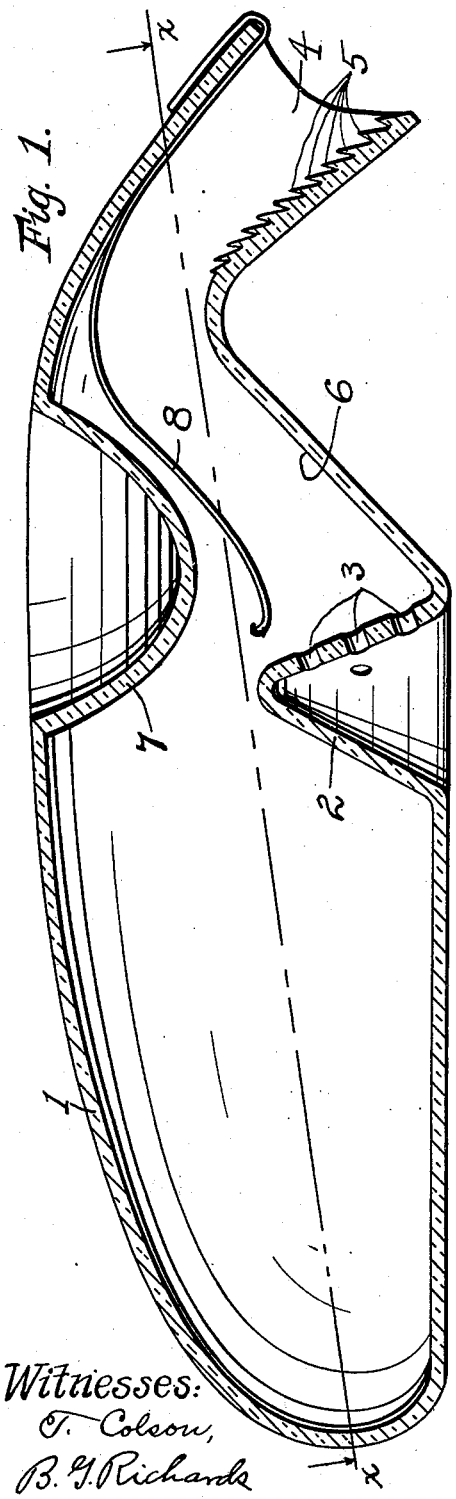
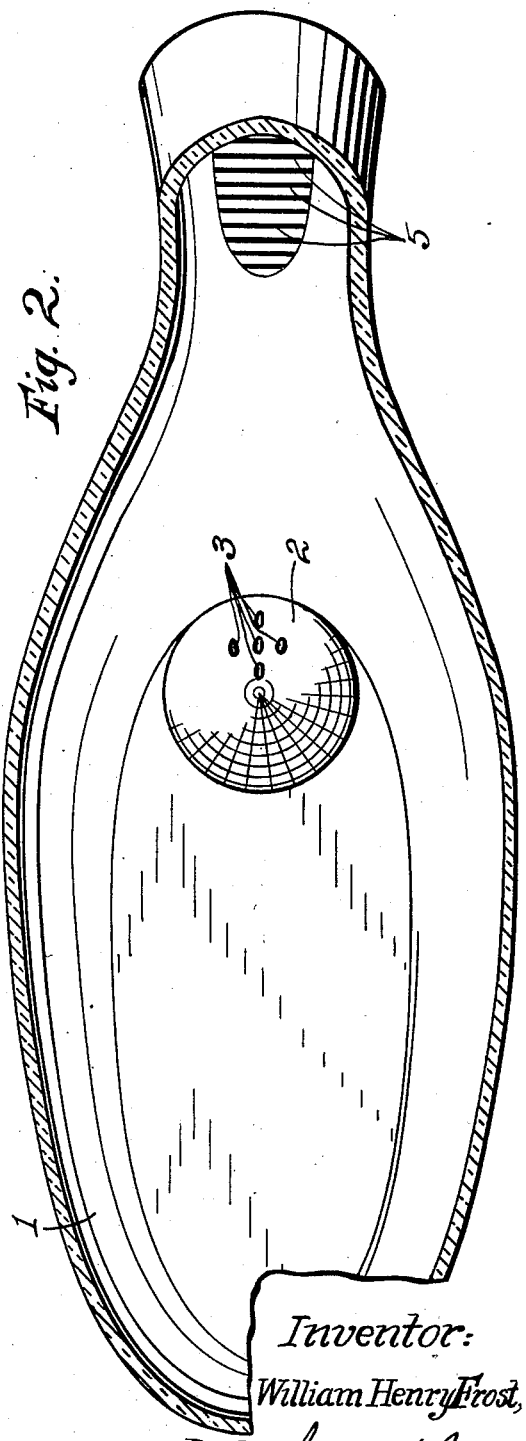
Witnesses:
T. Colson,
B. J. Richards
Inventor:
William Henry Frost,
By Joshua R. H. Potts
his Attorney.

UNITED STATES PATENT OFFICE.

WILLIAM HENRY FROST, OF CHICAGO, ILLINOIS.

TRAP.

1,085,599.   Specification of Letters Patent.   Patented Feb. 3, 1914.

Application filed February 12, 1913. Serial No. 747,872.

*To all whom it may concern:*

Be it known that I, WILLIAM HENRY FROST, a citizen of the United States, and a resident of the city of Chicago, county of Cook, and State of Illinois, have invented certain new and useful Improvements in Traps, of which the following is a specification.

My invention relates to improvements in traps especially adapted for the capture of rats and the like and has for its object the provision of a device of this character which is of simple construction and efficient in operation.

The invention consists in the combinations and arrangements of parts hereinafter described and claimed.

The invention will be best understood by reference to the accompanying drawing forming a part of this specification, and in which, Figure 1 is a vertical longitudinal medial section of a trap embodying my invention, and Fig. 2 is a section taken on line *x—x* of Fig. 1.

The preferred form of construction, as illustrated in the drawing comprises a hollow body 1 preferably made of glass and provided in its bottom with an upwardly extending conical projection 2 adapted to receive bait, as indicated. The forward portion of bait receptacle 2 is provided with perforations 3 which permit escape of the odor of the bait to attract the animals. The body 1 is also provided with a forwardly and downwardly inclined inlet 4 having teeth 5 adapted to facilitate the entry of the animal to said body but to afford no foothold for escape. A smooth inclined surface 6 leads from the inlet 4 and permits the entry of the animals to said body, but on account of its smoothness prevents their escape. A downwardly extending projection 7 is formed in the top of the body 1 adjacent the inner end of inlet 4 to prevent animals leaping from the body portion of the trap into the inlet portion. A suspension wire 8 is secured to the upper mouth portion of inlet 4 and extends rearwardly into the body of the trap, the inner end thereof being turned upwardly and pointed for the reception of bait.

By this arrangement it will be observed, that the animals may readily enter the trap but cannot escape owing to the smooth surface 6 and the projection 7. By placing the bait in the bait receptacle 2, access of the animals is prevented so that the trap will remain baited indefinitely no matter how many animals are captured.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A trap made entirely of glass and comprising a hollow body provided with an inclined inlet passage having teeth facilitating entry therethrough, a steep smooth incline surface leading from the bottom of the trap to said inlet passage and a conical bait covering projection in the bottom of the trap, there being bait odor emitting perforations in said conical perforations, substantially as described.

2. A trap made entirely of glass and comprising a body provided with an inlet having teeth to facilitate entry therethrough, there being a steeply inclined smooth surface leading from said inlet to the body, a downwardly extending projection located in said body opposite the inner end of said inlet and positioned slightly therefrom and an upwardly extending hollow perforated bait receptacle in the bottom of the central portion of said body located slightly to the rearward of said projection, substantially as described.

In testimony whereof I have signed my name to this specification in the presence of two subscribing witnesses.

WILLIAM HENRY FROST.

Witnesses:
 JOSHUA R. H. POTTS,
 THOMAS W. COLSON.

Copies of this patent may be obtained for five cents each, by addressing the "Commissioner of Patents, Washington, D. C."